Figure 1:
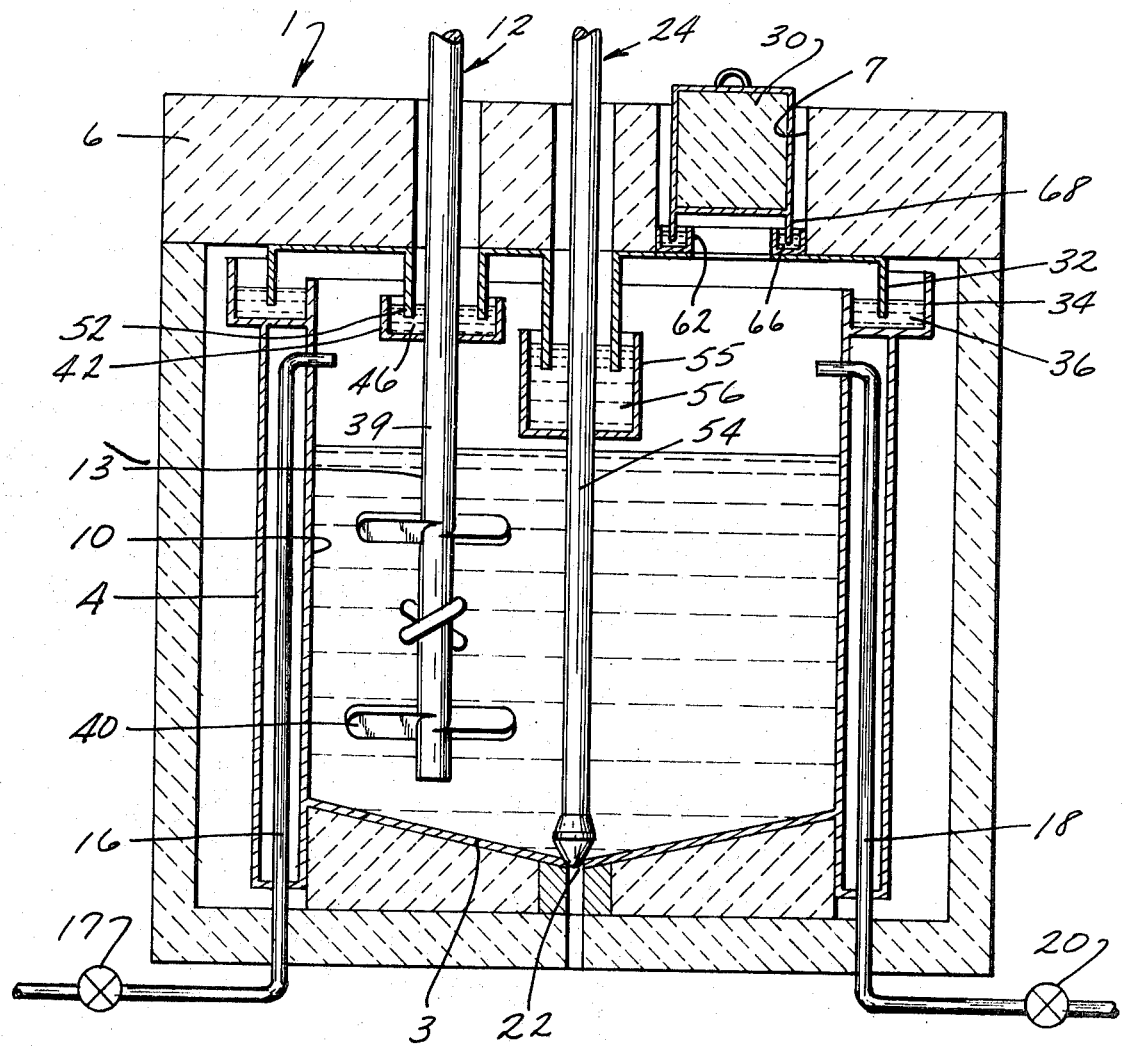

United States Patent
Chapman et al.

[15] 3,656,924
[45] Apr. 18, 1972

[54] APPARATUS AND METHODS FOR MELTING GLASS COMPOSITIONS FOR GLASS LASER RODS

[72] Inventors: George C. Chapman; James T. Le Sueur, both of Toledo, Ohio

[73] Assignee: Owens-Illinois, Inc.

[22] Filed: Nov. 17, 1969

[21] Appl. No.: 877,076

[52] U.S. Cl. ............................ 65/32, 65/129, 65/134, 65/330, 65/335, 65/374
[51] Int. Cl. ............................................. C03b 5/18
[58] Field of Search ............... 65/32, 126, 129, 134, 157, 65/221, 325, 330, 335, 347, 374; 13/6; 106/52

[56] References Cited

UNITED STATES PATENTS

| | | | |
|---|---|---|---|
| 2,113,956 | 4/1938 | Wadsworth | 65/330 X |
| 2,155,131 | 4/1939 | Hanlein | 65/157 |
| 3,209,641 | 10/1965 | Upton | 65/335 X |
| 3,343,982 | 9/1967 | Maxwell et al. | 65/32 X |
| 3,471,409 | 10/1969 | Lee et al. | 106/52 X |

Primary Examiner—S. Leon Bashore
Assistant Examiner—Robert L. Lindsay, Jr.
Attorney—Richard D. Heberling and E. J. Holler

[57] ABSTRACT

Methods of melting and refining molten glass for the production of glass laser rods, the glass having a relatively high lithia content of at least about 8 mole percent, the glass being melted in a platinum lined furnace having a roof, sidewalls and a bottom having a discharge opening and a plunger adapted to open and close the opening. The method includes the steps of (1) charging into the furnace by means of a charge opening and a charge tube raw glass batch materials in the form of oxides, (2) melting the batch materials to form molten glass and refining the same, (3) providing an atmosphere of inert gas above the molten glass by a flow of gas into the atmosphere, and using the inert gas to purge any air from the furnace atmosphere during the charging of the raw batch materials, (4) stirring the molten glass with stirrers having platinum surfaces on the portion thereof exposed to the molten glass furnace atmosphere, (5) sealing the charge tube, the stirrers and the plunger with molten glass seals to prevent air from coming into the furnace atmosphere and to prevent condensation of platinum vapors to thereby eliminate deposits of platinum containing material in the molten glass which could cause platinum inclusions, and (6) charging the molten refined glass through the discharge opening for the production of high quality glass laser rods having a minimum of platinum inclusions.

17 Claims, 2 Drawing Figures

INVENTORS
GEORGE C. CHAPMAN
BY JAMES T. LE SUEUR
E. J. Hollar and
Richard D. Heberling
ATTORNEYS

APPARATUS AND METHODS FOR MELTING GLASS COMPOSITIONS FOR GLASS LASER RODS

THE INVENTION

The present invention relates to apparatus and methods for melting and refining normally highly corrosive lithium silicate glass compositions for the production of high quality glass laser rods with a minimum of undesirable platinum inclusions.

In the past, it has been very difficult to make high quality glass laser rods with a minimum of platinum inclusions. The molten glass is corrosive and even in platinum lined furnaces or melting tanks the resultant glass laser rods suffered from the drawback of having undesirable platinum inclusions. It has been particularly difficult to make high quality glass laser rods without an undesirable amount of platinum inclusions, particularly those glasses that have a high lithium content in the neighborhood of about 15 to 35 mole percent based on the total glass composition.

It is an object of the present invention to provide an apparatus for melting and refining a lithium silicate glass composition having a relatively high amount of $Li_2O$ in the range of about 8 or 10 up to as high as about 35 or 40 mole percent to produce high quality glass laser rods therefrom with a minimum of platinum inclusions.

It is an object of the present invention to provide methods of melting and refining molten glass having a high lithia content of at least about 15 mole percent based on the total glass composition.

It is an object of the present invention to provide an apparatus and method for melting and refining molten glass for the production of glass laser rods, the apparatus including a furnace or melting chamber with a roof, sidewalls and a bottom, a charge opening in the roof, means for introducing inert gas for the furnace atmosphere over the molten glass including an outlet conduit, and means for purging the furnace during the charging including an outlet conduit and a solenoid valve located therein for evacuating air through the charge opening during the charge operation.

Figure 2:
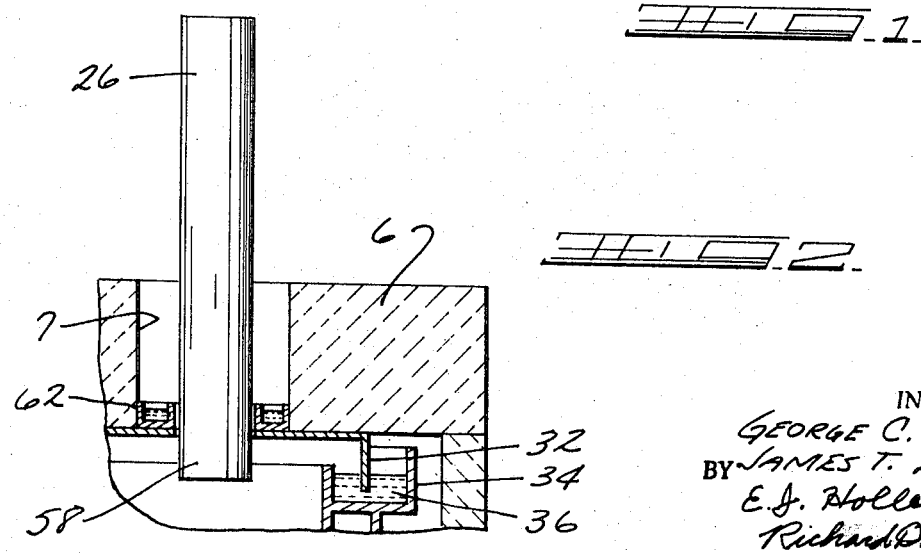

These and other objects will be apparent from the specification that follows, the appended claims, and the drawings in which:

FIG. 1 is a fragmentary front elevational view, partly in section, of a furnace for melting and refining molten glass for the production of glass laser rods; and FIG. 2 is a fragmentary front elevational view of a portion of the furnace shown in FIG. 1 with the charge tube in position for charging raw batch materials into the furnace.

The present invention provides an apparatus for melting and refining a lithium silicate glass composition having a relatively high amount of lithia in the range of about 8 or 10 to 35 or 40 mole percent, the apparatus comprising a furnace for melting and refining the molten glass, a roof, a platinum liner for the inside walls of the furnace, a stirrer preferably made of platinum for stirring the molten glass, means for introducing an inert gas such as nitrogen for the furnace atmosphere, means for withdrawing the gas from the interior of the furnace so as to continually purge the same, means for withdrawing the molten glass within the furnace including a discharge opening and a plunger for the opening and closing of the discharge opening, means for charging raw batch materials into the furnace including a charge opening and a charge tube adapted to fit therewithin, and means for sealing the charge means, the stirring means, the plunger, and the juncture between the sidewalls and the roof, to eliminate the condensation of platinum vapors which could cause platinum inclusions in the molten glass and also to eliminate the entrance of air into the furnace atmosphere which could cause platinum inclusions in the resultant glass laser rod. The furnace or melting chamber is preferably heated electrically as is well known in the art and is housed within refractory sidewalls and a bottom member.

The present invention is also directed to methods of melting and refining molten glass for the production of glass laser rods.

The methods include (1) charging into a platinum lined furnace having a roof, sidewalls and a bottom with a discharge opening and a plunger adapted to open and close the opening, certain raw glass-forming batch materials in a nonvolatile form, (2) melting the nonvolatile batch materials to form molten glass and refining the same in a furnace, (3) providing a nitrogen gas or other inert gas atmosphere above the molten glass during the charging step and during the melting and refining steps, (4) stirring the molten glass with platinum stirrers, (5) sealing the charge opening, the stirrers, the juncture between the roof and sidewalls, and the plunger with molten glass seals to prevent the deposition of platinum vapors and to prevent the entrance of air into the furnace to thereby eliminate undesirable deposits of platinum containing material which could cause platinum inclusions in the resultant glass laser rod, and (6) discharging the molten refined glass through the discharge opening for the production of high quality glass laser rods having a minimum of undesirable platinum inclusions.

As seen in the drawings, the present invention comprises an apparatus for melting and refining a lithium silicate glass composition having a relatively high amount of $Li_2O$ in the range of at least about 8 mole percent, the apparatus comprising a furnace 1 having a bottom 3, sidewalls 4 and a roof 6 having a charge opening 7 for the charging of nonvolatile or low volatile raw batch materials into the interior of the furnace. As seen in the drawings, the sidewalls and bottom of the furnace, as well as the roof, are provided with a liner 10 having a platinum surface to hold the molten glass during the melting and fining thereof, the liner covering substantially the bottom, roof and sidewalls of the furnace which are exposed to the molten glass and the furnace atmosphere. A stirrer 12 is provided with a platinum surface 13 for stirring a molten glass.

Means for introducing an inert gas such as nitrogen to the furnace atmosphere over the molten glass is provided. The inert gas atmosphere means includes an inlet conduit 16, a control valve 17 in the conduit 16, an outlet conduit 18, and a source of inert gas under pressure, not shown. As best seen in FIG. 1, a solenoid valve 20 is provided in the outlet conduit for shutting off the exhausting of the inert gas from the furnace through the conduit 18 during the charging operation. The flow of inert gas such as nitrogen purges the furnace atmosphere during charging by escaping through the charge opening to prevent any air from entering the furnace atmosphere during charging. The solenoid valve 20 is then opened after the recharging period and the flow of gas continued into the furnace atmosphere from the inlet conduit and outlet conduit during the melting, fining and discharging operations.

Means for withdrawing the molten glass from the furnace after it has been thoroughly melted and fined includes a discharge opening 22 and a plunger 24 for opening and closing the discharge opening. Means for charging the raw batch materials is provided, such means including the charge opening 7 in the roof 6 and a charge tube 26 adapted to fit through the charge opening during the charging operation. A charge opening cover 30 is provided to help block and seal the charge opening during the melting and fining operation.

As previously indicated and as shown in the drawings, molten glass sealing means is provided for the charge means, the stirring means, the plunger and for the juncture between the roof and sidewalls so as to prevent condensation of vapors on colder areas and to prevent air from entering the furnace atmosphere which could result in platinum inclusions in the molten glass and in the glass laser rod. With respect to the sealing of the above-described structures to the passage of air or platinum vapors, etc., it is preferred that the sealing means be molten glass that usually is of a sodium boroaluminosilicate glass composition or other relatively viscous glass having a viscosity of at least about log 2.5 or log 3 up to as high as log 4 or more at the melting temperature (generally about 2,300° F. to 3,000° F. and preferably about 2,500° to 2,700 F.) and being capable of keeping platinum vapors from going through the seal from the inside of the furnace and keeping air from going through the seal from the outside to the inside of the furnace. The preferred sodium boroaluminosilicate glass has a composition containing magnesium oxide, calcium oxide and barium oxide. One highly preferred glass composition is one that contains the following ingredients in approximate percentages by weight: $SiO_2$ 66–69, $B_2O_3$ 0.5–3, $Al_2O_3$ 1.5–4, $K_2O$ 0.1–1.5, $Na_2O$ 14–17, CaO 4–7, MgO 3–5, BaO 1–3.

In connection with the molten glass seal for the charge opening, the preferred glass composition is less viscous than the previously described glass and generally has a viscosity of about log 1.5 to log 2.2 and preferably about log 2 at the melting temperature. One composition that has been used advantageously with the charge opening seal is one having a viscosity of about log 2 at the melting temperature and having the following ingredients in approximate mole percentages:

| Ingredients | Percent |
|---|---|
| $SiO_2$ | 45–75 |
| $Li_2O$ | 45–35 |
| CaO | ½–30 |
| $Al_2O_3$ | 0–8 |

An outstanding glass composition for the charging means seal is one comprising the following ingredients in approximate mole percentages:

| Ingredients | Percent |
|---|---|
| $SiO_2$ | 60 |
| $Li_2O$ | 27.5 |
| CaO | 10 |
| $Al_2O_3$ | 2.5 |
| $Nd_2O_3$ | 0.5 |

Turning to the sealing means between the juncture of the sidewalls and the furnace roof, a roof baffle 32 is provided between the top of the sidewalls and the roof at the juncture thereof. A hollow sealing container or member 34 located at the top of the sidewalls and the roof is provided and the container 34 is at least partially filled with molten glass 36. As seen in the drawings, the roof baffle 32 extends at least part way into the molten glass 36 to thereby prevent air from entering the furnace atmosphere. The molten glass bath 36 also prevents the passage of platinum vapors to colder surfaces and hence prevents the deposit of platinum containing material in the molten glass which could result in platinum inclusions in the final product—the glass laser rod.

As previously indicated, sealing means is preferred for the stirrer means, the stirrer means comprising a stirrer 12 having a rotatable shaft 39 and a blade 40. Container 42 is provided around the stirrer shaft 39 which is located in the atmosphere above the molten glass near the roof 6. The stirrer shaft 39 passes through the container and the container is filled with molten glass 46. There is provided a stirrer baffle member 52 concentric to and outside the shaft 39. The end of the stirrer baffle member 52 extending into the molten glass 46 to thereby prevent air from entering the melting chamber and to prevent the deposit of platinum vapors on colder areas such as the shaft and thereby eliminate platinum inclusions in the final product.

As previously described, there is provided a sealing means for the plunger, the plunger 24 having a shaft 54 passing through a hollow container 55 which is filled at least part way with molten glass 56. As previously indicated, there is provided a sealing means for the charge opening 7, comprising the charge tube 26 preferably having a stainless steel surface 58 on at least a portion thereof exposed to the furnace atmosphere during charging. Generally, the charge tube is exposed to the heat of the furnace only about 20 to 40 seconds. However, a stainless steel charge tube has been preferred to one of platinum. The preferred stainless steels including heat resistant steels containing generally from about 65 to 95 percent by weight of iron and alloying metals such as Cr, Mn, Ni and Co in amounts of about 1 or 2 up to 5 or 20 or more percent.

The sealing means for the charge opening comprises a hollow circular member 62 for sealing the charge tube opening. The circular member 62 is located in the roof near the bottom thereof and around the outer periphery of the charge opening 7. The container 62 holds molten glass 66 which preferably has a relatively low viscosity of about log 2 at the melting temperature. The charge cover has a bottom portion 68 in the form of a baffle which extends into the circular container member 62 to prevent air from entering the furnace atmosphere from the outside and prevent the deposition of platinum vapors on cooler surfaces which in turn would tend to cause platinum inclusions in the final product. The bottom of the charge cover and the baffle is preferably made of platinum or has a platinum surface. Likewise, the baffles for the juncture between the sidewalls and the roof and for the plunger and for the stirrer means are preferably made of platinum or have platinum surfaces. Although the preferred material is platinum for lining the furnace interior and for covering surfaces, etc. exposed to the furnace atmosphere, in some cases where not as high a quality is desired, an alloy of platinum/rhodium can be used in which the platinum content is 90 to 95 or 98 percent by weight of the alloy. In some cases other noble metals such as silver and gold can be used in place of the platinum.

As previously indicated, the preferred gas is nitrogen although other inert gases such as argon, helium, krypton and neon can be used for some applications.

The use of the apparatus and the methods of the present invention provide for the production of high quality glass laser rods from a normally corrosive molten glass material. Outstanding glass rods can be made of a normally corrosive composition at the melting temperature which comprises the following ingredients in approximate mole percentages:

| Ingredients | Percent |
|---|---|
| $SiO_2$ | 45–75 |
| $Li_2O$ | 15–35 |
| CaO | ½–30 |
| $Nd_2O_3$ | 1/10–2 |
| $Al_2O_3$ | 0–8 |

The above-described glass laser composition also preferably includes a solarization inhibiting oxide that is preferably cerium oxide in amounts of about 0.1 to 0.3 mole percent. The resulting glass laser composition, when made using the apparatus and methods of the present invention, results in a glass laser rod having a relatively high efficiency and low solarization in high power pulsed application, the glass laser rod having a minimum of undesirable platinum inclusions. Glass laser rod compositions such as above-described are described in U.S. Pat. No. 3,471,409 for an invention of Lee and Rapp for "Glass Lasers For High Energy Application", which patent is hereby incorporated by reference.

Another patent, namely U.S. Pat. No. 3,457,182 for an invention of Lee and Rapp entitled "Glass Compositions For Laser Application" sets forth glass laser compositions suitable for use in the present invention. The compositions of this patent comprise the following ingredients in approximate weight and mole percentages:

| Ingredients | Weight Percent | Mole Percent |
|---|---|---|
| $SiO_2$ | at least about 45 up to 80 | 45–75 |
| $Al_2O_3$ | >about 4 up to 40 | 2–25 |
| $Li_2O$ | >about 5.5 up to about 20 | 8–40 |
| $Nd_2O_3$ | at least about 1 up to 8 | 0.2–2 |

The compositions of the above-identified patent make outstanding laser rods when processed according to the methods of the present invention and using the apparatus thereof. The disclosure of the U.S. Pat. No. 3,457,182 is also hereby incorporated by reference.

It has been found that a propeller stirrer generally produces the most homogeneously melted and refined molten glass. Although helical stirrers and stirrers of other design can be used which tend to mix and stir the molten glass well, the propeller stirrer appears to shear, or break up the molten glass in a fashion that leads to more homogeneous high quality glass.

As previously indicated, it is highly preferred the raw batch materials be introduced in a nonvolatile form in which preferably only oxides are used. Hence, for a glass containing $SiO_2$, $Li_2O$, $CaO$, $Al_2O_3$, $Nd_2O_3$, only the oxides of these materials would be used to help reduce the corrosive nature of the melting of the raw batch materials. In this way, a batch of, say, 50.1 pounds can be used to prepare a glass with an equivalent weight of 50 pounds. If nonvolatile materials such as lithium carbonate were to be used, the batch weight required would be much higher and the volume would be larger. Some of the oxides can be combined as in the case of lithium silicate which contains only $Li_2O$ and $SiO_2$.

By following the method steps previously discussed and using the apparatus described herein, excellent high quality laser glass can be obtained with a minimum of platinum inclusions in spite of the difficulty of working with normally corrosive molten glass at high temperatures with considerable vibration due to the stirrers and plunger, etc.

What is claimed is:

1. An apparatus for melting and refining a silicate glass composition, the apparatus comprising:
   a furnace having a bottom and sidewalls for holding the silicate glass composition,
   a roof for the top of said furnace,
   a liner having a platinum surface for the bottom and sidewalls of the furnace to hold the molten glass,
   a stirrer with a platinum surface for stirring the molten glass,
   means for introducing an inert gas for the furnace atmosphere over the molten glass,
   means for withdrawing the inert gas from the interior of the furnace,
   means for withdrawing the molten glass from the furnace including a discharge opening and a plunger for opening and closing the discharge opening,
   means for charging raw batch materials into the furnace including a charge opening in the roof and a cover therefor that fits in the charge opening, and
   sealing means for the charge means, the stirring means, the discharge means and the juncture between the roof and the sidewalls comprising molten glass seals to eliminate the condensation of platinum vapors on colder areas which could cause platinum inclusions in the molten glass, there being an air-tight glass seal to prevent travel of air therethrough and positioned between the molten glass and openings out of the furnace around each of the charge opening, the stirring means, the discharge means and juncture, each seal being so constructed and arranged that air from outside the furnace cannot travel into the furnace atmosphere.

2. An apparatus as defined in claim 1 in which the means for introducing the inert gas comprises an outlet conduit and a valve located therein whereby the flow of gas through the outlet conduit can be stopped when the furnace is being charged to purge out ambient air through the charge opening and opened during the period of melting and refining the glass.

3. An apparatus as defined in claim 2 in which the molten glass seals comprise a sodium boroaluminosilicate glass having a viscosity of about log 2.5 to log 3 at the melting temperatures, the molten glass keeping air from going therethrough.

4. An apparatus as defined in claim 2 in which the molten glass seals comprise a sodium boroaluminosilicate glass composition containing magnesium oxide, calcium oxide and barium oxide.

5. An apparatus as defined in claim 3 in which a roof baffle is provided between the top of the sidewalls and the roof at the juncture thereof, there being a hollow sealing member at least partially filled with the molten glass between the top of the sidewalls and the roof, the roof baffle extending at least part way into the molten glass to thereby prevent air from entering the melting chamber and to minimize the contamination of the molten laser glass in the furnace with platinum containing material that could cause platinum inclusions.

6. An apparatus as defined in claim 5 in which the stirrer has a rotatable shaft and a blade, a hollow container is provided around the stirrer shaft located in the atmosphere above the molten glass and near the roof, the stirrer shaft going through the container and the container filled with molten glass, there being provided a stirrer baffle member concentric to and outside the shaft, the end of the stirrer baffle member extending into the molten glass, there being a hollow container around the plunger shaft in the furnace atmosphere, the plunger shaft passing through the container, the container being filled at least part way with molten glass, a concentric baffle outside the plunger shaft coming down from the roof and into the molten glass to prevent air from entering the melting chamber and to prevent deposits of the platinum containing materials on the stirrer shaft in the furnace and on the plunger shaft to eliminate platinum inclusions.

7. An apparatus as defined in claim 1 in which the charge means includes a tube that is moved into the charge opening during charging, the tube having a stainless steel surface that is exposed to the furnace atmosphere during charging.

8. An apparatus as defined in claim 6 in which the stirrer is a propeller stirrer.

9. An apparatus as defined in claim 2 in which the valve is a solenoid valve.

10. A method of melting and refining molten glass for the production of glass laser rods, the glass having a relatively high lithia content of at least about 8 mole percent of the total glass composition, the glass being melted in a platinum-lined furnace having a roof, sidewalls and a bottom having a discharge opening and a plunger that opens and closes the opening, the method comprising the steps of
   I. charging into the platinum-lined furnace by means of a charge opening batch materials in a nonvolatile form,
   II. melting the batch materials to form molten glass and refining the same in a furnace,
   III. providing an atmosphere of inert gas above the molten glass during steps I and II,
   IV. stirring the molten glass with stirrers having platinum surfaces on at least a portion thereof exposed to the molten glass in furnace atmosphere,
   V. sealing openings from the furnace atmosphere to outside the furnace around the charge opening, the stirrers, the juncture between the furnace roof and sidewalls, and the plunger with molten glass seals to prevent air from entering the furnace atmosphere and to eliminate deposits of platinum containing material which could cause platinum inclusions, there being a glass seal positioned between the molten glass and openings out of the furnace around each of the charge opening, the stirrers, the plunger and juncture, each seal being so constructed and arranged that vapors from the furnace atmosphere cannot travel through the seals and air from outside the furnace cannot travel into the furnace atmosphere, and
   VI. discharging the molten refined glass through the discharge opening for the production of high quality glass laser rods having a minimum of platinum inclusions.

11. A method as defined in claim 10 in which, during the step III of providing an atmosphere of inert gas above the molten gas, including stopping the flow of inert gas in an outlet conduit to prevent air from entering the furnace atmosphere.

12. A method as defined in claim 11 in which the molten glass seals comprise a sodium boroaluminosilicate glass having a viscosity of about log 2.5 to log 3 at the melting temperatures, the glass seals keeping platinum vapors from going through the molten glass and keeping air from going through the molten glass.

13. A method as defined in claim 12 in which the molten glass seals comprise a sodium boroaluminosilicate glass composition containing magnesium oxide, calcium oxide and barium oxide.

14. A method as defined in claim 13 in which the glass laser composition comprises the following ingredients in the approximate mole percentages:

| Ingredients | Percent |
|---|---|
| $SiO_2$ | 45–75 |
| $Li_2O$ | 15–35 |
| CaO | 1/2–30 |
| $Nd_2O_3$ | 0–0–2 $Al_2O_3$ |
| $CeO_2$ | 0–0.3 |

15. A method as defined in claim 12 in which the inert gas is nitrogen.

16. A method as defined in claim 10 in which the raw batch materials are oxides of silica, lithium, calcium, aluminum and neodymium.

17. A method as defined in claim 10 which includes the step of purging the atmosphere above the molten glass during charging by a flow of inert gas into the furnace to force any air in the furnace through the charge opening.

* * * * *

UNITED STATES PATENT OFFICE
CERTIFICATE OF CORRECTION

Patent No. 3,656,924              Dated April 18, 1972

Inventor(s) George C. Chapman and James T. LeSueur

It is certified that error appears in the above-identified patent and that said Letters Patent are hereby corrected as shown below:

Col. 2, line 74, insert --°-- after "2700". Col. 3, line 20, "45-35" should be --14-35--. Col. 4, line 48, "application" should be --applications--. Col. 7, Claim 14, the chart containing the Ingredients and Percent should read as follows:

| Ingredients | Percent |
|---|---|
| $SiO_2$ | 45-75 |
| $Li_2O$ | 15-35 |
| $CaO$ | 1/2-30 |
| $Nd_2O_3$ | 1/10-2 |
| $Al_2O_3$ | 0-8 |
| $CeO_2$ | 0-0.3 |

Signed and sealed this 30th day of January 1973.

(SEAL)
Attest:

EDWARD M. FLETCHER, JR.              ROBERT GOTTSCHALK
Attesting Officer                    Commissioner of Patents